United States Patent
Flores Velasquez et al.

(10) Patent No.: US 11,497,592 B2
(45) Date of Patent: Nov. 15, 2022

(54) INSTRUMENT FOR IN SITU MEASUREMENT OF THE ANGLE OF CONVERGENCE IN A DENTAL PREPARATION

(71) Applicant: UNIVERSIDAD DE LA FRONTERA, Temuco (CL)

(72) Inventors: Marco Antonio Flores Velasquez, Temuco (CL); Rodolfo Gabriel Figueroa Saavedra, Temuco (CL)

(73) Assignee: UNIVERSIDAD DE LA FRONTERA, Temuco (CL)

( * ) Notice: Subject to any disclaimer, the term of this patent is extended or adjusted under 35 U.S.C. 154(b) by 475 days.

(21) Appl. No.: 16/609,046

(22) PCT Filed: Apr. 28, 2017

(86) PCT No.: PCT/IB2017/052508
§ 371 (c)(1),
(2) Date: Oct. 31, 2019

(87) PCT Pub. No.: WO2018/197929
PCT Pub. Date: Nov. 1, 2018

(65) Prior Publication Data
US 2020/0146798 A1    May 14, 2020

(51) Int. Cl.
*A61C 19/04*    (2006.01)
*A61C 5/70*    (2017.01)
(Continued)

(52) U.S. Cl.
CPC ............... *A61C 19/04* (2013.01); *A61C 5/70* (2017.02); *G01B 3/56* (2013.01); *G01B 5/24* (2013.01)

(58) Field of Classification Search
CPC .. A61C 19/04; A61C 5/70; A61C 3/00; A61C 5/77; A61C 19/00; G01B 3/56;
(Continued)

(56) References Cited

U.S. PATENT DOCUMENTS 397,500  A  *  2/1889  Hoadley ................. G01B 3/56
                                                33/472
501,807  A  *  7/1893  Peterson ................. G01B 3/56
                                                33/472
(Continued)

FOREIGN PATENT DOCUMENTS

BE         886219  A  *  3/1981  ............ A61B 17/10
CA       2313898  A1  *  1/2002  ............... G01B 5/24
(Continued)

*Primary Examiner* — Jacqueline T Johanas
*Assistant Examiner* — Holly T. To
(74) *Attorney, Agent, or Firm* — Lucas & Mercanti, LLP (57) ABSTRACT

An in situ measuring instrument of the convergence angle (CA) of a dental preparation or stump in the field of dentistry, applied to humans or other species, having a movable bar, and a support bar arranged parallel to each other and coupled perpendicularly and slidable relative to a central bar by a first guiding hole at one end of the central bar and a second guiding hole at one end of the support bar which allow the relative vertical movement of the movable bar and horizontal movement of the support bar, allowing both bars to be adjusted to the base of the stump. This instrument allows measuring both natural and artificial teeth and implants, as well as fixed and mobile prostheses, just as if any device attached to the tooth (artificial or implant) is desired to be installed.

20 Claims, 8 Drawing Sheets

(51) Int. Cl.
  *G01B 3/56* (2006.01)
  *G01B 5/24* (2006.01)

(58) Field of Classification Search
  CPC .. G01B 5/24; G01B 3/00; A61B 90/06; A61F 2002/4668
  USPC .......................................................... 433/72
  See application file for complete search history.

(56) References Cited

U.S. PATENT DOCUMENTS

| | | | | |
|---|---|---|---|---|
| 568,597 A * | 9/1896 | Belcher | | G01B 3/56 33/473 |
| 587,637 A * | 8/1897 | Basuch | | G01B 3/56 33/425 |
| 783,804 A * | 2/1905 | Smith | | A61C 19/04 33/514 |
| 890,287 A * | 6/1908 | Londick | | G01B 3/20 33/796 |
| 986,239 A * | 3/1911 | Stoddard | | G01B 3/56 33/456 |
| 1,107,276 A * | 8/1914 | Farrington | | G01B 3/20 33/501 |
| 1,123,294 A * | 1/1915 | Hewitt | | G01B 3/56 33/472 |
| 1,229,069 A * | 6/1917 | Hagman | | B43L 7/12 33/473 |
| 1,281,715 A * | 10/1918 | Todt | | G01B 3/20 33/796 |
| 1,640,435 A * | 8/1927 | Armstrong | | G01C 1/00 33/277 |
| 1,678,019 A * | 7/1928 | Oates | | G01B 3/56 33/472 |
| 1,751,833 A * | 3/1930 | Millar | | A61C 19/045 33/513 |
| 1,814,441 A * | 7/1931 | Ford | | G01B 3/56 33/472 |
| 2,001,654 A * | 5/1935 | Burrows | | G01C 1/00 33/424 |
| 2,028,622 A * | 1/1936 | Phelps | | G01B 5/24 33/1 SB |
| 2,495,558 A * | 1/1950 | Walton | | G01B 3/56 33/538 |
| 2,504,244 A * | 4/1950 | Barclay | | G01B 3/56 33/420 |
| 2,540,555 A * | 2/1951 | Slaughter, Jr. | | A61C 19/04 33/513 |
| 2,791,836 A * | 5/1957 | Gerber | | G01B 5/24 33/561.1 |
| 3,583,071 A * | 6/1971 | Bitter | | A61C 19/04 33/513 |
| 3,745,665 A * | 7/1973 | Shilliday | | A61C 19/04 33/514 |
| 4,226,025 A * | 10/1980 | Wheeler | | G01B 3/166 600/587 |
| 4,442,606 A * | 4/1984 | Graham | | G01B 3/56 33/1 PT |
| 4,979,312 A * | 12/1990 | Wool | | A61C 7/02 33/513 |
| D321,055 S * | 10/1991 | Carchidi | | D24/176 |
| 5,056,238 A * | 10/1991 | Chi | | G01B 3/20 D10/73 |
| 5,158,096 A * | 10/1992 | Clark | | A61B 5/107 73/379.03 |
| 5,337,489 A * | 8/1994 | Mustafa | | E21B 41/0007 33/534 |
| 5,685,084 A * | 11/1997 | Demers | | A61C 19/04 33/513 |
| 6,048,322 A * | 4/2000 | Kushida | | A61B 5/1076 600/587 |
| 6,634,353 B1 * | 10/2003 | Knebelman | | A61F 5/566 128/200.24 |
| 6,726,472 B2 * | 4/2004 | Kuhn | | A61C 19/04 33/514 |
| 7,735,237 B1 * | 6/2010 | Moon | | G01B 3/20 33/783 |
| 8,347,517 B2 * | 1/2013 | Polei | | G01B 3/563 33/514 |
| 8,690,569 B2 * | 4/2014 | Machado | | A61C 1/084 433/75 |
| 2002/0144420 A1 * | 10/2002 | Mora | | G01B 3/56 33/370 |
| 2003/0203335 A1 * | 10/2003 | Richmond | | A61C 19/04 33/513 |
| 2003/0233761 A1 * | 12/2003 | Erskine-Smith | | A61C 19/04 33/513 |
| 2008/0177503 A1 * | 7/2008 | Stockman | | G01B 5/02 702/161 |
| 2012/0030957 A1 * | 2/2012 | Kipnes | | G01D 11/30 33/701 |
| 2012/0159798 A1 * | 6/2012 | Kozykowski | | G01B 5/24 33/534 |
| 2021/0077279 A1 * | 3/2021 | Rodriguez | | G01B 3/56 |

FOREIGN PATENT DOCUMENTS

| | | | | |
|---|---|---|---|---|
| CN | 105509618 A * | 4/2016 | | G01B 5/24 |
| CN | 108050919 A * | 5/2018 | | G01B 5/24 |
| CN | 108056839 A * | 5/2018 | | |
| CN | 108692630 A * | 10/2018 | | E21B 41/0007 |
| CN | 109186423 A * | 1/2019 | | G01B 5/24 |
| CN | 111059434 A * | 4/2020 | | |
| CN | 111879212 A * | 11/2020 | | A61B 5/1072 |
| DE | 940937 C * | 3/1956 | | |
| DE | 4111278 A1 * | 10/1992 | | |
| DE | 4422721 A1 * | 1/1996 | | A61C 19/04 |
| DE | 10312755 A1 * | 10/2003 | | A61B 5/1072 |
| DE | 202006009576 U1 * | 9/2006 | | A61C 19/04 |
| DE | 202007000734 U1 * | 5/2007 | | A61C 19/04 |
| EP | 0270487 A1 * | 6/1988 | | |
| EP | 0907066 A2 * | 4/1999 | | E06B 9/01 |
| ES | 2421064 A1 * | 8/2013 | | E06B 9/01 |
| FR | 354629 A * | 10/1905 | | B21D 5/006 |
| FR | 508147 A * | 10/1920 | | |
| FR | 2539979 A1 * | 8/1984 | | G01B 5/0004 |
| FR | 2782380 A1 * | 2/2000 | | G01B 3/20 |
| FR | 3018602 A1 * | 9/2015 | | B21D 5/006 |
| GB | 2099597 A * | 12/1982 | | G01B 5/0004 |
| GB | 2255182 A * | 10/1992 | | A61B 5/0053 |
| GB | 2256487 A * | 12/1992 | | E21B 41/0007 |
| GB | 2357146 A * | 6/2001 | | A61C 19/04 |
| GB | 2513097 A * | 10/2014 | | A61C 19/04 |
| KR | 20120110526 A * | 10/2012 | | A61C 19/04 |
| RU | 163331 U1 * | 7/2016 | | |
| SU | 1026798 A1 * | 7/1983 | | |
| SU | 1380742 A1 * | 3/1988 | | |
| SU | 1404787 A1 * | 6/1988 | | |
| WO | WO-2011014939 A1 * | 2/2011 | | A61B 90/06 |
| WO | WO-2011018851 A1 * | 2/2011 | | A61C 1/084 |
| WO | WO-2011141937 A1 * | 11/2011 | | A61C 7/14 |
| WO | WO-2018154425 A1 * | 8/2018 | | A61C 19/06 |
| WO | WO-2018197929 A1 * | 11/2018 | | A61C 19/04 |

* cited by examiner

INSTRUMENT FOR IN SITU MEASUREMENT OF THE ANGLE OF CONVERGENCE IN A DENTAL PREPARATION

CROSS REFERENCE TO RELATED APPLICATION

This Application is a 371 of PCT/IB2017/052508 filed on Apr. 28, 2017, which is incorporated herein by reference.

FIELD OF THE INVENTION

The present application is addressed to a measuring instrument in the field of health, technical or professional education or quality control of prepared teeth. In particular, the present technology refers to an clinical measurement instrument of the convergence of the walls for dental preparations in dentistry, in which, for the elaboration of a fixed prosthesis, on a human or another species tooth, if mouth implants are used that require the creation of a stump or dental preparation that has two opposite walls, including piercing type implants. Specifically, it is directed to an instrument that fulfills the function of measuring the convergence angle of a tooth, directly on the dental preparations during the stump making process.

The present invention is feasible to be use for measuring stump preparation proficiency, in formative processes, for measuring skills.

PRIOR ART

Currently, when dentists require to make a fixed unit prosthesis (porcelain or metal-porcelain crown) on a tooth as a pillar, they must do so by wearing the tooth and leaving a dental stump. This stump has an approximate shape of a truncated pyramid. Further, in order to provide resistance and retention properties to the structure that will cover the tooth (fixed prosthesis), the stump walls must have an adequate convergence. This convergence is given by the opposite walls of this stump; and is the most important feature for retention property. This convergence is formed by means of a projection towards its coronal end, and it is recommended an angle of approximately 6°. This angle formed in the dental preparation, is known as the "convergence angle of the preparation" (CA) and is calculated by the convergence in degrees that occurs between the two opposite axial walls of the preparation. The classic denture texts recommend that the ideal should be 6°, and even 4° and other 5°. However, there are currently several authors who cite an ideal of CA as a range from 6° to 12°.

However, several studies show that dentists who perform dental preparations for fixed prostheses do not reach the recommended values for an adequate CA (Nordlander et al. J Prosthet Dent 1988; 60: 148-51, Owen. J Prosthet Dent 1986; 56: 148-53, Mack. Oral Rehabil 1980; 7: 255-65, Leempoel et al. J Prosthet Dent 1987; 58: 414-6) and it is not reached by dental students (Noonan et al. J Prosthet Dent 1991; 66: 706-8, Annerstedt et al. Acta Odontol Scand 1996; 54: 109-12, Al-Omari et. Quintessence Int 2004; 35: 287-93, Ayad et al. J Dent 2005; 33: 633-8). Other studies research the CA achieved or made by dentists with or without experience, or undergraduate or graduate dentistry students; or what is the obtained CA in posterior teeth or anterior teeth. These studies show that CA quantification by performers is not immediate during the stump preparation, and that only after preparation, quantification studies are performed. These subsequent measurements of the CA of dental preparations are obtained subsequently and indirectly from the preparation, for example, by the use of preparations in "typodonts" that are teeth simulations, or dies that are an exact copy of the dental preparations, by means of printing technique and emptying with extra hard plaster; with the use of either photographic instruments, overhead projectors, or goniometric microscopes that quantify the CA of the above mentioned die; or highly sophisticated intraoral cameras.

In order to reach the CA recommendation guidelines, clinicians must be able to visualize the CA of the prepared tooth and determine if it is adequate. Currently, there is no direct empirical way for measuring CA during the stump making process. No study, to date, has shown a direct clinical instrument that is capable of measuring step by step, during the making of the dental preparation, the CA being produced.

The difficulty of obtaining clinically an adequate CA seems to be, according to some authors, the degree of experience of the clinician, or the degree of cognitive preparation of the student (when there is no experience), or the techniques or instruments that can be used for preparing the stump itself (preparation guides or intraoral parallelizers). However, none of these topics seems to be conclusive. Even so, the common denominator in the studies is that performers do not have access to the direct quantification of CA during their stump construction process.

In the state of the art the following documents have been found with a nearby technical field, but different in terms of the problem to be solved and the proposed solution.

U.S. Pat. No. 3,745,665A patent which presents a manually operated measurement device to determine the angle included between the upper and lower central incisors during orthodontic correction procedures. This device measures angles of the incisors that are not prepared, but only displaced by the orthodontic treatment, which ensures that the teeth axes are according to the standard they are looking for. But it does not useful for measuring the convergence angle corresponding to dental preparations of crowns. Therefore, it has another main objective with respect to the present invention (which is measuring convergence angle of dental preparations). In addition, its size is large, in relation to the size of a person's mouth and its use is referred to the front sector and almost out of the mouth.

In U.S. Pat. No. 4,824,367A an alignment indicator of a dental drill is provided, which allows a crown preparation within certain parameters, and seeks to determine a suitable axis of the preparation. It is an electronic instrument, whereby luminous parameters indicate if the drill is inside or outside the ideal axis. It is closer to this technical field since the dental preparation works, but does not measure the convergence angle, which renders its use very limited. It does not give freedom for handling angulation ranges. While our instrument has the quality of giving exact parameters of the preparation conicity.

In DE4111278A, it is disclosed an apparatus for measuring angles of conical objects, which has a general scissors shape and the tip bent at 90 degrees, which allows measuring the angle of the tip of a tapered object. This device measures taper, but it cannot be applied to measure the convergence angle of a dental preparation. It can hardly be complementary to the preparation because it does not specify a possible dental use nor does it have a vertical adjustment, essential for an adequate CA measurement. Therefore, it does not relate at all with the proposed solution of our instrument.

In EP2228033A, it is disclosed a measuring device for determining multiple parameters when total dentures are produced. It measures dental parameters for total removable prostheses, unlike the present invention that measures dental preparations, in particular CA. Essentially, it is a large conveyor to be used outside the mouth or at the front, at the level of anterior teeth. Therefore, this measuring device does not solve the proposed technical problem.

Therefore, it is concluded that none of the documents studied meets the objective of the present invention.

The Technical Problem Solution

Currently there is no way to measure the "convergence angle of the preparation" (CA) during the stump construction process for fixed prostheses, crowns on teeth or implants that require a stump, to correct the posed problem, is provided a CA clinical measurement instrument of dental or other preparations. The preparation performer directly uses the instrument on the tooth, which measures the CA during the stump construction process. This instrument adapts to the stump walls and is capable of capturing the inclination of these axial walls, allowing the user to know the result in situ.

This instrument allows measuring both natural and artificial teeth and implants, as well as fixed and mobile prostheses, just as if any device attached to the tooth (artificial or implant) is desired to be installed.

SUMMARY OF THE INVENTION

The instrument has a central bar, which two bars are perpendicularly coupled therein. These bars have each a degree of freedom to adapt to the position of height and width of the stump base. The first bar is attached to the margin of the outer (vestibular) wall of the stump, vertically adjusted in order to adapt to the different heights of the stump margins, while the second bar is adjusted to the inner wall (palatal or lingual) of the stump. A moving rod or indicator part is held at the end of the second bar by an axis, which, when pivoting (rotating), adjusts to the angle of one side of the dental preparation, and the other end of the moving rod is arranged as an indicator which allows to see the measure of the convergence angle in an angularly graduated ruler that is fixed to the second bar.

The advantage of the instrument is that it measures absolute CA, directly and immediately on the stump, without having to wait for the result in another session of an impression and subsequent die, for then with a more detailed and later analysis, to relatively know the CA value of the prepared stump.

The clinical instrument can be sterilized with the autoclave system normally used for medical or dental instruments. It does not replace any instrument, since it does not exist, on the market, something similar to measure CA. Therefore, it has a significant contribution to the problem solution of direct CA quantification of the stump, such as studied in detail in the scientific field. It can be used constantly throughout the stump preparation. It does not replace the dentist experience, but rather, complements it, and for the dental student or neophyte dentist, it provides a collaborative instrument of the dental preparation process by shortening the time and improving the quality of it.

DETAILED DESCRIPTION OF THE INVENTION

FIGS. 1 to 4 show different views of a mechanical version of the present invention, which gives an idea of the parts, as a whole and their relative proportions. While FIG. 5 shows the same version but in use, the device for measuring the convergence angle of the stump (20), lies on both vestibular (buccal) and palatal or lingual walls, at the base of the preparation (in the preparation margin). Further, the invention will be described in detail with the geometric characteristics of this first version.

Figure 1:
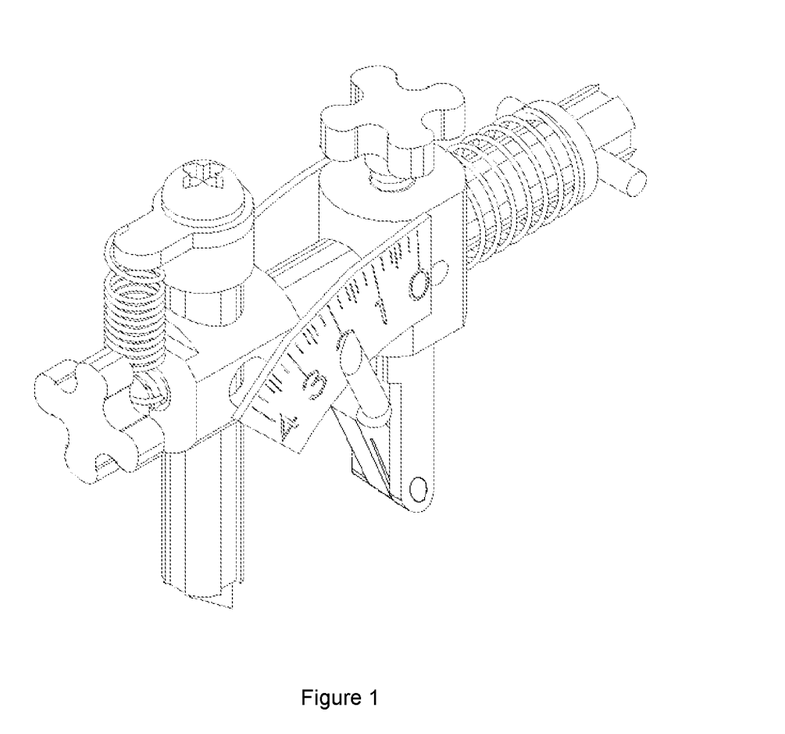
FIG. 1: Perspective view of an embodiment of the clinical instrument of the present invention, with analogue graduation.
Figure 2:
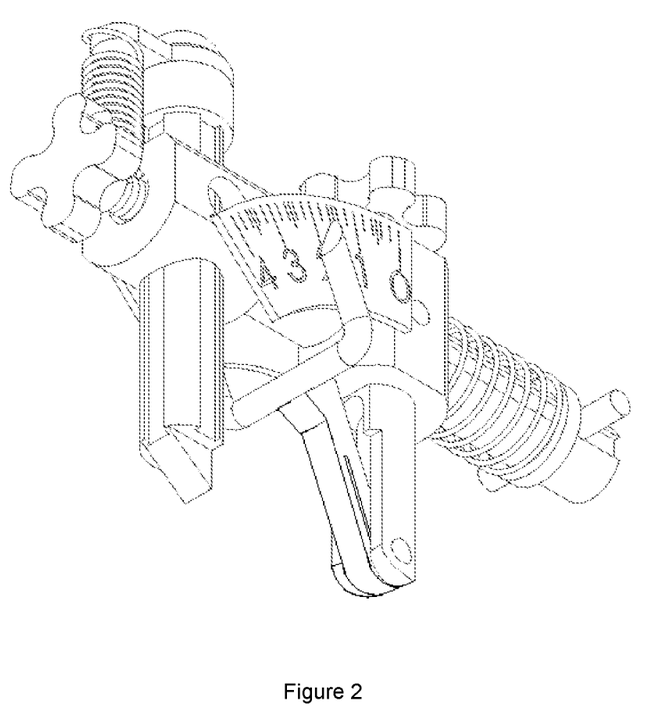
FIG. 2: Bottom perspective view of the embodiment of FIG. 1.
Figure 3:
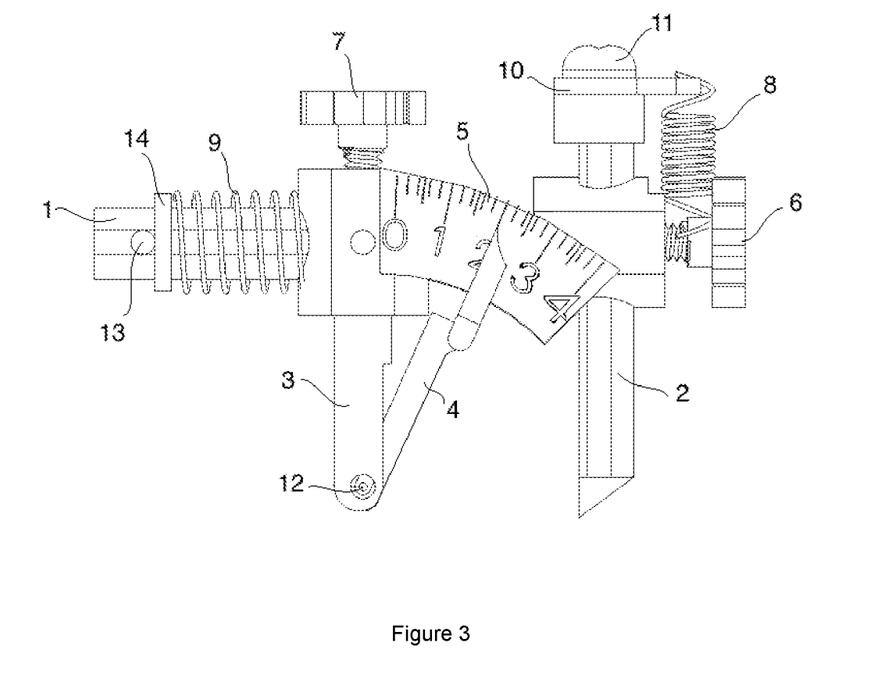
FIG. 3: Plan view of the embodiment of FIG. 1.
Figure 4:
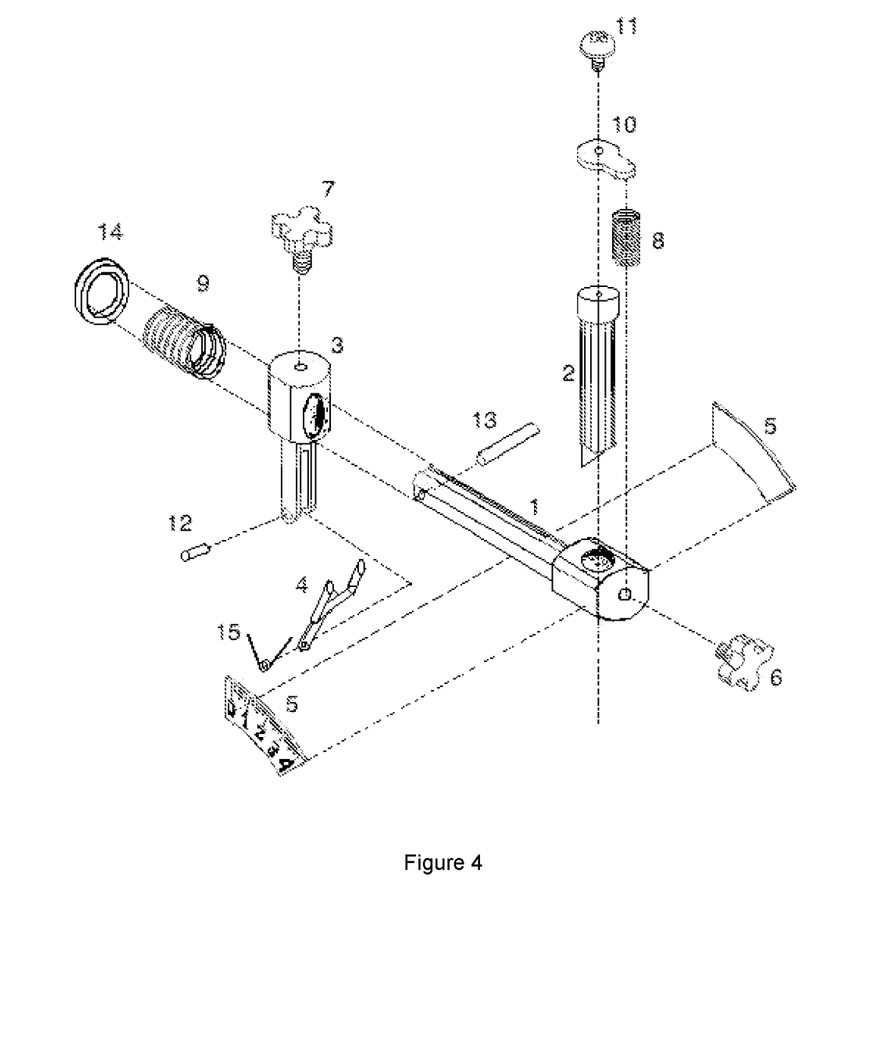
FIG. 4: Exploded view of the embodiment of FIG. 1.
Figure 5:
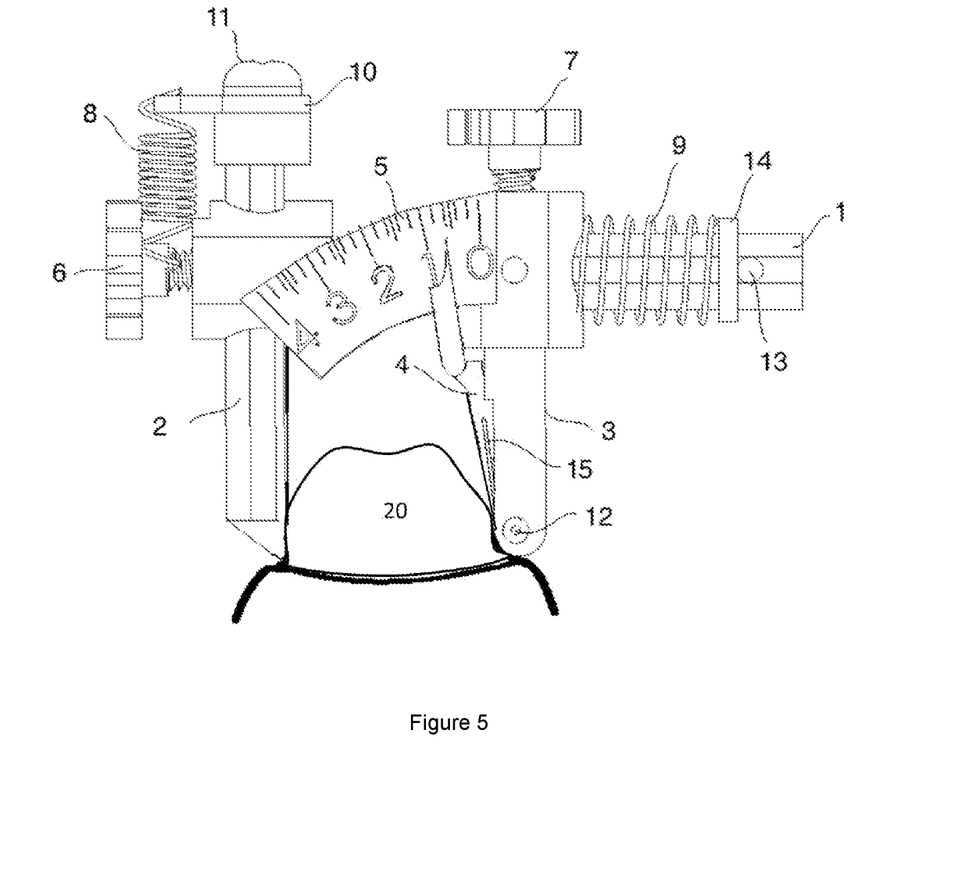
FIG. 5: Schematically shows the instrument application by measuring the convergence angle on the dental stump.

The present invention is an instrument consisting of three main parts, for identification of the different assembled and exploded parts, see FIGS. 3 and 4. The fundamental part is the central bar (1), which corresponds to a longitudinally grooved solid cylinder in whose end has a cylindrical widening of its diameter with straight edges thereof, in whose widening has a cylindrical hole, perpendicular to the axis of the latter, which allows the vertical movement of the second part, a movable bar (2), shaped like a cylindrical rod with flat edges at its end. The third part, a support bar (3), is similar to the second part, but has a cylindrical widening at its upper end, which has a hole thereof which allows it to engage and move horizontally with respect to the central bar (1), and towards its other end, the part has an internal groove and a perforation in its lower end.

Two secondary parts are added to these three main parts. In the perforation of the support bar (3), a measuring rod (4) is coupled, which is inserted into the groove of the support bar (3) by one end and at its other end finish in a parallel U-shaped. The last part is a graduated curved ruler (5) that is double and is welded to the support bar (3) by the widened part in the area of the straight edges on both sides of the support bar (3).

To facilitate the reading of the ruler, the disclosed embodiment has a graduation from 0 to 4, whereas the number must be multiplied by 10, such as 1 is 10 degrees, 2 is 20 degrees, 3 is 30 degrees, with a maximum of 40 degrees. Between numbers are marks that represent variations of 2 degrees. And a slightly longer mark is made in the middle between each number that corresponds to 5, 15, 25 and 35 degrees. In addition, the invention can incorporate a magnifying glass on the graduated ruler.

The instrument also comprises two fixing screws (6) and (7) for the bars (2) and (3) respectively. Further, it comprises three springs (8 or 8*a*), (9) and (15). The spring (8) is fixed to the upper end of the movable bar (2) by a plate (10) and screw (11) system. Furthermore, it has two pins, one that functions as a shaft (12) by coupling parts (3) and (4) at its end, and a pin (13), a bit larger, that fixes a neck (14) that goes from top to the spring (9) on the cylinder of the central bar (1). Finally, between the measuring rod (4) and the support bar (3), there is a torsion spring (15) thereof, thus achieving a permanent pressure, biasing the measuring rod (4) against the stump (20), facilitating the measurement of the convergence angle. The invention can also be carried out incorporating elements which allow digital reading of the convergence angle, see FIG. 6. In which case the graduated double ruler (5) will be exempted, and electronic components will be included for measuring the angle of the measuring rod (4), such as a variable resistor (16) at the axis position (12), in connection with a digital degree reading system that includes a digital display (17).

Figure 6:
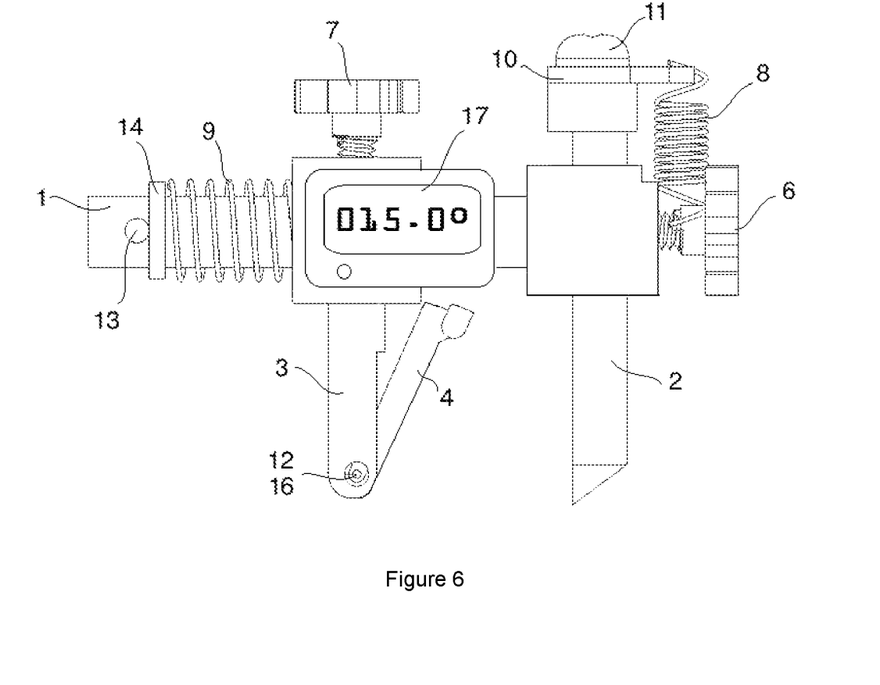
FIG. 6: Plan view of another embodiment of the clinical instrument of the present invention, with an electronic display.

In relation to the geometry of the main parts, the central bar (1) and the bars (2) and (3), they can be conformed from bars with a square or rectangular section or any polygonal section comprising edges. This makes the use of longitudinal grooves unnecessary. FIG. 6 shows the instrument constructed with rectangular bars or rods.

Figure 7:
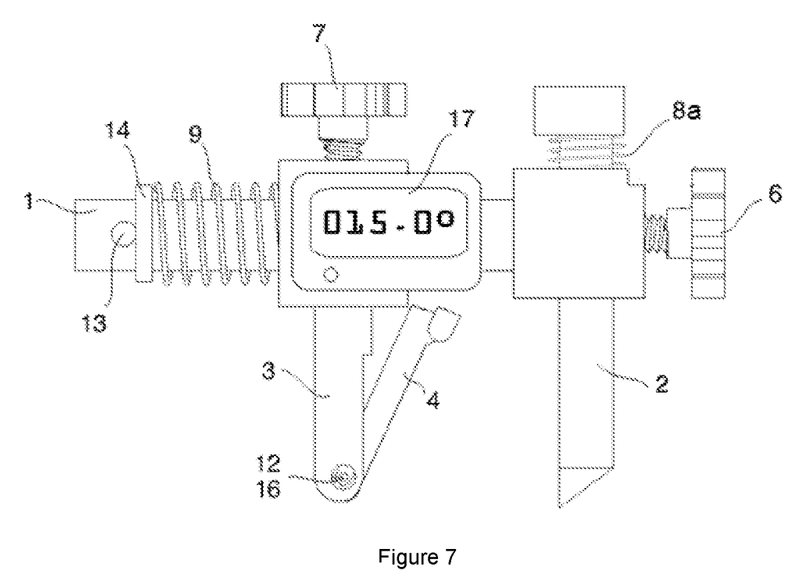
FIG. 7: Plan view of a variation with respect to the previous figure of the clinical instrument of the present invention with the electronic display.

In an alternative mode of the spring (8), the spring (8a) in FIG. 7 works compressed around the movable bar (2) between the upper end of said bar and the widening of the central bar (1).

The instrument can be manufactured using various plastic and/or metallic materials, such as PVC, stainless steel, copper, among others. In this way, it is also possible to provide a device that can be disposable or re-usable.

In a preferred embodiment of the present invention, an in situ measurement instrument of the convergence angle (AC) of a dental preparation or stump (20) is specified in the field of dentistry, applied to humans or other species, comprising a movable bar (2) and a support bar (3) that are parallel to each other and coupled perpendicularly and slidable with respect to a central bar (1) by a first guiding hole at one end of the central bar, and a second hole of guidance at one end of the support bar (3) allowing the relative vertical movement of the movable bar (2) and horizontal movement of the support bar (3), allowing both bars (2 and 3) to adjust to the base of the stump (20) where the movable bar (2) is arranged to rest on the external-buccal stump wall by means of a vertical movement with respect to the central bar (1) and a first screw (6) allows to fix its position, and the support bar (3) is arranged to fit the contact of the base of the stump (20) by a horizontal movement with respect to the central bar (1) and a second screw (7) allows to fix its position, at the distal end of the bar support (3), a straight, thin and "Y" shaped measuring rod (4) with parallel upper ends is mounted thereof, and that can pivot about an axis (12), a double ruler (5) located on both sides of the support bar (3) is angularly graduated, where the upper ends of the measuring rod (4) can pass over the ruler (5) allowing the CA to be read from both sides, by simple parallax.

In one embodiment, the movement of the movable bar (2) towards the base of the stump (20) is aided by a spring (8) which is mounted in traction between the movable bar (2) and the central bar (1) by a small plate (10) and a screw (11). This spring (8) vertically resists against the pushing from the bottom of the movable bar (2), helping better adapting the end of the movable bar (2) to the stump base, which is fixed by means of the screw (6). Optionally, the movement of the movable bar (2) towards the base of the stump (20) is opposed by the spring (8a) that is compressed around the movable bar (2) between the upper end of it and the widening of the central bar (1).

The central bar (1), at the opposite end of the first guiding hole, has a compression spring (9) mounted between the support bar (3) and a grommet (14) fixed by a pin (13) which crosses the central bar (1). The spring (9) push the support bar (3) towards the movable bar (2), so that it helps keeping the instrument in position against the base of the dental stump (20), and the support bar (3) is fixed by means of the screw (7).

The screws (6 and 7) above mentioned have, optionally, a butterfly shape on their head so that it eases manual operation.

In another embodiment, the central bar (1) and the bars (2 and 3) are rods of rectangular section.

The instrument also has a torsion spring (15), which is compressed between the measuring rod (4) and the support bar (3), exerting a force that pushes the measuring rod (4) against the stump wall (20), facilitating the measurement of the convergence angle of said stump.

Conveniently, on each side of the double ruler (5) a mini magnifying glass is attached, which leaves free space for the movement of the indicator end of the measuring rod (4) while increasing the display of the degrees of the ruler (5). This mini magnifying glass is removable to facilitate sterilization processes.

In a particular embodiment of the instrument the central bar (1) and the bars (2 and 3) are formed from circular section bars. In which case, the first guiding hole in the central bar (1) comprises at least one inner projection that cooperates with at least one longitudinal groove in the movable bar (2); and in addition the cross section of the central bar (1) comprises at least one longitudinal groove and the support bar (3) comprises at least one inner projection in the second guiding hole cooperating with said longitudinal groove.

Optionally, the first guiding hole in the central bar (1) is formed in a widening of the central bar and said guiding hole is perpendicular to the longitudinal axis of the central bar (1). Similarly, the support bar (3) has a widening in which the second guiding hole is formed in an orientation perpendicular to the longitudinal axis of the support bar (3).

In a mechanical embodiment of the instrument, the double ruler (5) comprises a pair of angularly graduated circumference arcs, in which each arc is fixed to faces of the support bar (3), flat and parallel to the plane in which the measuring rod (4). Where the double ruler (5) is angularly graduated from 0° to a maximum value between 15° and 50°.

Figure 8:
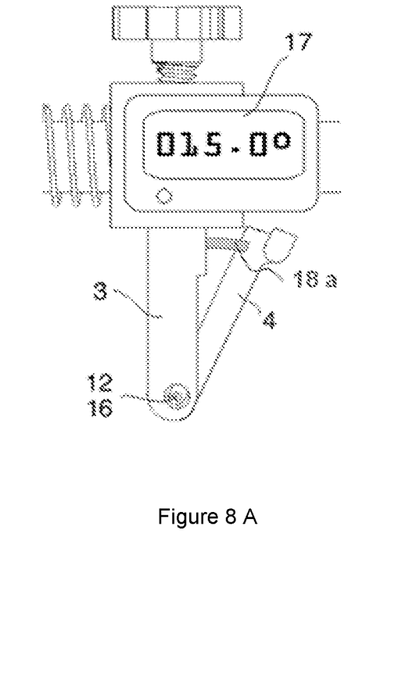
FIG. 8: Detailed view showing a variable resistive sheet in two options, one with a curved sheet near the tip of the angle measuring rod that adapts to the tooth (A) and another with a variable triangular sheet near the axis of rotation of the rod (B).

In another embodiment, an electronic device is included with at least one numerical display (17) attached to the instrument for reading the CA (convergence angle). Said electronic device is in communication with a variable resistor connected to measure angular variation between the support bar (3) and the measuring rod (4). In a particular embodiment, the variable resistance is a variable resistive sheet (18a) with an arc segment shape and fixed to the support bar (3), and the measuring rod (4) has a sliding connection with the variable resistive sheet (18). In another embodiment, the variable resistance is a variable resistive sheet (18b) with a triangular shape fixed to the shaft (12), and the measuring rod (4) has a sliding connection with a variable resistive sheet (18b).

The material in which the instrument of the present invention is manufactured includes: plastic, aluminum, steel, stainless steel, Cu, polyether ether ketone (PEEK).

In another embodiment, the present instrument comprises a central bar (1) oriented horizontally coupled perpendicularly and slidably with a movable bar (2) and a support bar (3), wherein the bars (2, 3) are parallel to each other, and wherein the central bar (1) has a guiding hole at one of its ends, and a guide cross section in cooperation with the bars (2, 3) so that the movable bar (2) comprises a complementary cross section to move in a vertical direction through the guiding hole, and that the support bar (3) comprises a complementary guiding hole at one of its ends to move in a horizontal direction along the guide cross section of the central bar (1), at a distal end of the support bar (3) is mounted a measuring rod (4) about an axis (12) to pivot in the plane of the bars (2, 3), where the measuring rod (4) has its distal free end divided in the form of a fork, in order to move on a double ruler (5) angularly graduated, so that supported the distal end of the movable bar (2) by its vertical movement on an outer margin of the base of the stump (20) and adjusted the distance between the bars (2, 3) to the width of the base of the stump (20) by horizontal movement of the support bar (3) the measuring rod (4) is supported against an inside wall of the stump (20) indicating the convergence angle on the double ruler (5).

The invention claimed is:

1. An instrument for in situ measurement of the convergence angle (CA) of a dental preparation or stump in the field of dentistry, applied to humans or other species, comprising a movable bar and a support bar arranged parallel to each other and coupled perpendicularly and slidable relative to a central bar by a first guiding hole at one end of the central bar and a second guiding hole at one end of the support bar which allow the relative vertical movement of the movable bar and horizontal of the support bar, allowing both bars to be adjusted to the base of the stump, wherein the movable bar is arranged to rest on the external-buccal wall of the stump by a vertical movement with respect to the central bar, and a first screw allows to fix its position, and the support bar is arranged so as to be adjusted in contact of the base of the stump by a horizontal movement with respect to the central bar, and a second screw allows to fix its position, at the distal end of the support bar is mounted a measuring rod that is straight, thin and "Y" shaped with parallel upper ends, and that can pivot about an axis, a double ruler located on both sides of the support bar is angularly graduated, where the upper ends of the measuring rod can pass over the ruler allowing the reading of the CA from both sides, by simple parallax.

2. The measuring instrument according to claim 1, wherein the movement of the movable bar towards the base of the stump is aided by a spring which is tensioned between the movable bar and the central bar by a small plate and a screw.

3. The measuring instrument according to claim 1, wherein the movement of the movable bar towards the base of the stump is opposed by the spring that is compressed around the movable bar between the upper end of it and the widening of the central bar.

4. The measuring instrument according to claim 1, wherein the central bar, at the opposite end to the one with the first guiding hole, has a compression spring mounted between the support bar and a neck fixed by a pin that crosses the central bar.

5. The measuring instrument according to claim 1, wherein the screws have a butterfly shape in their head for manual operation.

6. The measuring instrument according to claim 1, wherein the central bar and the bars are rods of rectangular section.

7. The measuring instrument according to claim 1, further comprising a compressed torsion spring between the measurement rod and the support bar, exerting a force that pushes the measuring rod against the stump wall, facilitating the measurement of the convergence angle of said stump.

8. The measuring instrument according to claim 1, wherein each side of the double ruler a mini magnifying glass is attached, which leaves free space for the movement of the indicator end of the measuring rod while increasing the display of the degrees of the ruler, wherein the mini magnifying glass is also removable.

9. The measuring instrument according to claim 1, wherein the central bar and the bars are formed from rods of circular section.

10. The measuring instrument according to claim 9, wherein said first guiding hole in the central bar comprises at least one inner projection that cooperates with at least one longitudinal groove in the movable bar.

11. The measuring instrument according to claim 10, wherein a cross section of the central bar comprises at least one longitudinal groove and the support bar comprises at least one inner projection in the second guiding hole which cooperates with said longitudinal groove.

12. The measuring instrument according to claim 1, wherein the first guiding hole in the central bar is formed in a widening of the central bar and said guiding hole is perpendicular to the longitudinal axis of the central bar.

13. The measuring instrument according to claim 1, wherein the support bar has a widening in which the second guiding hole is formed in an orientation perpendicular to the longitudinal axis of the support bar.

14. The measuring instrument according to claim 1, wherein the double ruler is flat and comprises a pair of angularly graduated circumference arcs, in which each arc is fixed to faces of the support bar and parallel to the plane in which the measuring rod pivots.

15. The measuring instrument according to claim 1, wherein the double ruler is angularly graduated from 0° to a maximum value between 15° and 50°.

16. The measuring instrument according to claim 1, wherein the material in which it is manufactured includes: plastic, aluminum, steel, stainless steel, Cu, PEEK (polyether ether ketone).

17. An instrument for in situ measurement of the convergence angle (CA) of a dental preparation or stump in the field of dentistry, applied to humans or other species, comprising a movable bar and a support bar arranged parallel to each other and coupled perpendicularly and slidable relative to a central bar by a first guiding hole at one end of the central bar and a second guiding hole at one end of the support bar which allow the relative vertical movement of the movable bar and horizontal of the support bar, allowing both bars to be adjusted to the base of the stump, wherein the movable bar is arranged to rest on the external-buccal wall of the stump by a vertical movement with respect to the central bar, and a first screw allows to fix its position, and the support bar is arranged so as to be adjusted in contact of the base of the stump by a horizontal movement with respect to the central bar, and a second screw allows to fix its position, at the distal end of the support bar is mounted a measuring rod that is straight, thin and "Y" shaped with parallel upper ends, and that can pivot about an axis, an electronic device with at least one numerical display attached to the instrument for reading the CA.

18. The instrument according to claim 17, wherein the electronic device is in communication with a variable resistor connected to measure angular variation between the support bar and the measuring rod.

19. The instrument according to claim 18, wherein a variable resistance is a variable resistive sheet in the form of an arc segment and fixed to the support bar, and the measuring rod has a connection sliding with the variable resistive sheet.

20. The measuring instrument according to claim 18, wherein a variable resistance is a variable resistive sheet with a triangular shape fixed to the axis, and the measuring rod has a sliding connection with the variable resistive sheet.

* * * * *